United States Patent [19]

Bodle et al.

[11] 4,223,449

[45] Sep. 23, 1980

[54] HEAT-EFFICIENT METHOD FOR DEWATERING SOLIDS

[75] Inventors: William W. Bodle, Deerfield; Dharamvir Punwani, Bolingbrook, both of Ill.

[73] Assignee: Institute of Gas Technology, Chicago, Ill.

[21] Appl. No.: 52,567

[22] Filed: Jun. 27, 1979

[51] Int. Cl.$^3$ .............................................. F26B 3/00
[52] U.S. Cl. .......................................... 34/9; 44/27; 208/8 R
[58] Field of Search ............. 34/9; 208/8 R; 44/27 R, 44/29 R

[56] References Cited

U.S. PATENT DOCUMENTS

| | | | |
|---|---|---|---|
| 1,794,865 | 3/1931 | Pier et al. | 208/8 R |
| 1,863,669 | 6/1932 | Pier et al. | 208/8 LE |
| 1,881,968 | 10/1932 | Pier et al. | 208/10 |
| 2,610,115 | 9/1952 | Lykker | 34/9 X |
| 3,327,402 | 6/1967 | Lamb et al. | 34/9 |
| 3,520,067 | 7/1970 | Winegartner | 34/9 |
| 3,552,031 | 1/1971 | Evans et al. | 34/9 |
| 3,953,927 | 5/1976 | Hoffert | 34/9 |
| 4,014,104 | 3/1977 | Murphy | 34/9 |

*Primary Examiner*—John J. Camby

*Attorney, Agent, or Firm*—Allegretti, Newitt, Witcoff & McAndrews

[57] ABSTRACT

Water is removed from a hydrocarbonaceous solid such as peat by contacting the solid with a liquid solvent relatively free of moisture such as benzene or toluene at elevated temperatures, i.e. 200°–600° F. and preferably at elevated pressures to prevent excessive volatilization, i.e. pressures of about 1 to about 100 atmospheres, to transfer at least a portion of the moisture in the solid to the solvent. The solvent is further characterized by its relative inability to dissolve appreciable amounts of water at low or ambient temperatures and its ability to dissolve substantially greater amounts of water at higher temperatures, i.e. 200°–600° F. After the solids are contacted with the solvent and while the solids and solvent are still at an elevated temperature, at least a portion of the solvent, now containing dissolved water, is removed from the solids to provide a product solids having a diminished water content. The removed liquid stream, containing solvent and water, is then cooled to a lower temperature, i.e. less than 150° F., thereby causing the water to separate from the solvent as a separate phase and to provide a liquid solvent stream relatively free of moisture suitable for reuse in extraction of water from the solids. This system of moisture removal is particularly useful when a slurry of a solid in a solvent is to be prepared for passage to a high pressure reactor.

17 Claims, 1 Drawing Figure

U.S. Patent    Sep. 23, 1980    4,223,449
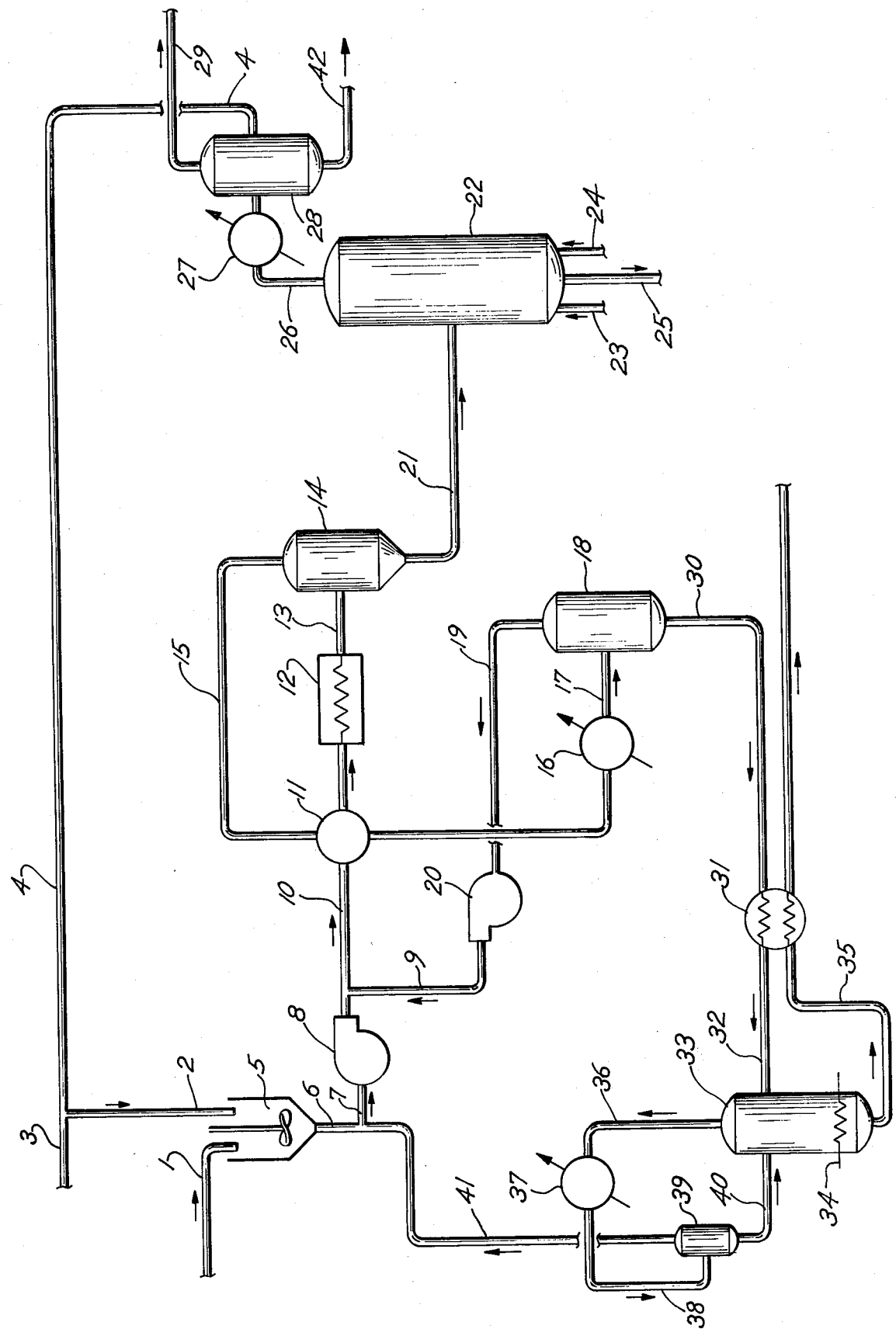

HEAT-EFFICIENT METHOD FOR DEWATERING SOLIDS

BACKGROUND OF THE INVENTION

The present invention relates to the removal of water from hydrocarbonaceous solids. More specifically, the present invention relates to a heat efficient method for the removal of water from hydrocarbonaceous solids, such as peat, containing large amounts of moisture. The present invention also relates to a heat efficient method to remove water from a hydrocarbonaceous solid such as peat prior to the conversion of the solid to a more valuable product such as a synthetic gaseous and liquid fuel.

Certain hydrocarbonaceous solids, particularly lower rank coals such as lignite and peat contain appreciable amounts of moisture. For example, peat can contain up to about 80–90% by weight water. This large amount of water must be removed, at least in part, if the peat is to serve as an efficient heat source by direct combustion or to serve as a feed to a high temperature process for converting the peat to a more valuable fuel, e.g. to convert the peat by gasification to a fuel gas. Moisture removal is required in each of these instances since much of the potential heating value of the peat would otherwise be consumed in the evaporation of the water from the peat at the high temperatures encountered. For example, when the peat is burned directly, much of the heat generated must be used to evaporate the water originally present in the peat. As a result, the full heating value of the peat is not achieved. Similarly, if the peat is to be subjected to a high temperature gasification reaction, the water present is evaporated during the reaction thus necessitating large, additional amounts of heat to sustain the reaction. Clearly, these disadvantages cannot be overcome by merely removing the water from the peat by heating and evaporation steps since the same inefficiencies are present.

The prior art has recognized the importance of removing water from hydrocarbonaceous solids. In Lamb, U.S. Pat. No. 3,327,402, coal fines are dried at low temperatures by contacting the fines with a volatile low molecular weight solvent such as acetone or various alcohols in which water is highly soluble at ambient temperatures to remove the water from the coal fines. The coal fines, in turn, are subjected to heating to evaporate the volatile solvent and to provide a relatively dry product. Similarly, in Murphy, U.S. Pat. No. 4,014,104, water is removed from lignite by contact with a low boiling organic solvent miscible in water. The solvent and remaining water is then removed from the lignite by heat. Characteristic of the Lamb and Murphy processes is the utilization of solvents in which water is highly soluble, such as alcohols. These alcohol solvents are expensive, volatile and cannot be efficiently used as medium to transfer the dried solids, as a slurry, to a high temperature reaction vessel to convert the solids to more valuable products. Further, separation of the alcohol, for reuse, from the extracted water by distillation requires the utilization of significant amounts of expensive energy.

The prior art has also removed moisture from a coal having a high moisture contact by contacting the coal with a heated, high boiling oil or oil slurry to evaporate the moisture contained in the coal. See for example, U.S. Pat. Nos. 3,520,067; 3,599,885 and 3,953,927. Contacting hydrocarbonaceous materials with liquids as part of a processing sequence is also illustrated in U.S. Pat. Nos. 1,863,669 (bitumen extraction with benzene); 1,881,968; 2,610,115 and 3,552,031 (water removal). In general, these latter prior art methods, where water removal is the express goal of the process, require the use of heat to remove the water from the solids by evaporation and are, as a result, thermally inefficient.

SUMMARY OF THE INVENTION

It is an object of the present invention to provide a heat efficient process for the extraction or removal of water from solid hydrocarbonaceous particles such as coal including low rank coals such as peat and lignite.

It is a further object of the present invention to provide a heat efficient method of extraction or removal of water from hydrocarbonaceous solids through a solvent extraction technique utilizing readily available hydrocarbon solvents therein.

It is a still further objection of the present invention to provide a heat efficient method of removing water from hydrocarbonaceous solids by solvent extraction techniques which do not depend on or require the use of distillation or evaporation techniques to remove the bulk of the water from either the coal or the solvent.

It is a specific object of the present invention to provide an efficient method for removal of water from hydrocarbonaceous solids and to provide a slurry of hydrocarbonaceous solids having a diminished moisture content suitable for introduction into a conversion process for the conversion of the hydrocarbonaceous particles into a more valuable product such as the gasification of hydrocarbonaceous material to fuel gas and related products.

In accordance with the present invention, these objects are accomplished by contacting a water containing solid hydrocarbonaceous material with a liquid solvent relatively free of moisture at an elevated temperature and preferably at an elevated pressure to transfer at least a portion of the water in the solid hydrocarbonaceous material into the liquid solvent. The solvent is characterized by certain specific properties. First, the solvent must not be able to dissolve appreciable amounts of water at ambient temperatures. In other words, the solvent must be able to dissolve only relatively small amounts of water at low temperatures, i.e. about 70° F. to about 150° F. The second characteristic of the solvent is, notwithstanding its relative inability to dissolve water at ambient tempertures, is its ability to dissolve substantially greater amounts of water at higher temperatures. Typical solvents possessing this property are hydrocarbon solvents, particularly aromatic hydrocarbons, and specifically benzene, toluene and any of the xylenes or mixtures thereof.

The water containing solid hydrocarbonaceous material containing water is contacted with the solvent at elevated temperatures for a sufficient time to permit at least a portion of the water in the solid to be transferred to or dissolved in the solvent. At least a portion of the solvent, now containing water, is then removed from the resultant solvent-solid mixture at an elevated temperature to provide a solvent stream containing water and a product solid stream having a diminished water content. Preferably, no cooling of the water containing solids and liquid solvent occurs until this removal or separation step is completed. After the solvent and solids are separated, the solvent containing water stream is then cooled to a lower temperature to cause the water to separate from the solvent and to provide a liquid solvent stream relatively free of water and a water stream relatively free of solvent. In other words, the cooling of the heated solvent containing water causes two separate phases to form; typically a lower, heavy water phase and a substantially water free solvent phase as a lighter upper phase. At least a portion, if not all, of the liquid solvent stream, now relatively free of moisture upon its separation from the separate water phase is then recycled for recontact with the fresh solid carbonaceous particles and to provide at least a portion of the liquid solvent required in this step of the process.

Preferably, the solid hydrocarbonaceous solid subjected to treatment in accordance with the present invention to remove at least a portion of the water therefrom is a coal including low rank coals containing substantial amounts of naturally occuring water such as lignite and peat.

In a particularly preferred embodiment of the present invention, there is provided an improvement in a process for the conversion of a water containing hydrocarbonaceous solid such as peat into a more valuable product in a conversion zone maintained at an elevated temperature and pressure such as a gasificiation reaction zone for the conversion of peat to a fuel gas wherein the presence of water in the hydrocarbonaceous solid lowers the overall thermal efficiency of the conversion process. According to this embodiment, at least a portion of the water in the hydrocarbonaceous solid is removed by contacting the water containing solid carbonaceous material with a liquid hydrocarbon solvent relatively free of water at an elevated temperature to transfer at least a portion of the water in the solid into the solvent. A portion of the solvent now containing water removed from the solid is separated from the solids at an elevated temperature, preferably without intervening cooling, to provide a solvent stream containing water and a slurry of solids having a diminished moisture content in admixture with at least a portion of the remaining solvent. The solvent stream now containing water is cooled to a lower temperature to provide distinct hydrocarbon and water phases wherein the hydrocarbon phase is relatively free of water and the water phase is relatively free of solvent. The thus produced hydrocarbon solvent stream, once again relatively free of moisture, is returned for contact with the original feed solids. The resultant slurry of dry hydrocarbonaceous solids and solvent is then passed to a conversion zone for conversion to more valuable products. As a result, increased thermal efficiency is obtained in the overall process. Preferably, the hydrocarbon solvent is recovered from the conversion zone in admixture with additional amounts of solvent which may be produced therein and is recycled back to the initial steps of the process for contact once again with the water containing or wet hydrocarbonaceous solids.

As is apparent from the summary of the invention, there is obtained a thermally efficient method for the extraction or removal of water from hydrocarbonaceous solids which does not require or need high energy consuming evaporation techniques. Instead, the water is removed from the hydrocarbonaceous solids through the utilization of specific solvents whereby the water removed from the solids can be removed from the solvent by cooling the solvent and providing separate water and solvent phases.

Other objects and embodiments of the present invention will appear in the following more detailed description of the present invention.

DETAILED DESCRIPTION OF THE INVENTION

The process of this invention can be utilized with any water containing solid carbonaceous solids wherein it is desirable to remove at least a portion of the water from the solids. Although the process can be utilized with solid hydrocarbonaceous materials such as oil shale, the process is particularly well suited for use with the various coals including anthracite, bituminous, lignite and peat. Since peat, in its naturally occuring state, contains as much as 80–90% by weight water and lignite contains as much as 40–50% by weight water in its naturally occurring state, these low rank species of coal are particularly well suited for utilization in the process of the present invention.

As indicated, the liquid solvent to be utilized to extract or remove the water from the solid carbonaceous material must have low solubility for water at low temperatures, e.g. 70°–150° F. Essential to the properties of the solent is its ability to dissolve substantially greater amounts of water at high temperatures, e.g. 200°–600° F. Preferably, the solvent has the ability to dissolve about 2 to about 10 times as much water at higher temperatures than it can at low temperatures. Although solvents capable of dissolving lesser amounts of water at elevated temperatures can be utilized in the process of the present invention, larger amounts of these solvents must be utilized to effectively remove substantial amounts of water from the hydrocarbonaceous solid material.

Particularly preferred solvents for utilization in the present invention are normally liquid hydrocarbons, particularly those which are produced as products or by-products in conversion of coal to gaseous or liquid fuels. These normally liquid hydrocarbons include aromatic hydrocarbons such as benzene, toluene, orthoxylene, metaxylene, para-xylene, ethylbenzene or mixtures thereof. Particularly preferred are mixtures of benzene, toluene and xylenes commonly referred to in the prior art as BTX. Additional liquids which can be utilized as solvents in accordance with the present invention include any normally liquid paraffin, olefin, naphthenic and aromatic hydrocarbons.

According to the present invention, the water containing solid hydrocarbonaceous materials are contacted at elevated temperatures with the liquid solvent which is relatively free of moisture. By use of the term "relatively free of moisture" is meant to refer to a solvent containing 10–50% of the amount of water which the solvent is capable of dissolving at the elevated temperature. It is not, however, essential for the solvent to be absolutely water or moisture free. The solvent and hydrocarbonaceous solid material can be contacted in either a continuous countercurrent or cocurrent manner or in a batch or semi-batch operation. Preferred contacting temperatures are in the range of about 200°–600° F. Particularly, preferred temperatures are within the range of about 300°–450° F. Preferably sufficient pressure is imposed upon the contacting zone to prevent undue evaporation or volatilization of the solvent used therein as well as of the water (as contained in either the solvent or the solids).

The amount of solvent utilized in the contacting step is a function of (1) the water content of the solvent utilized in the initial contacting step; (2) the solubility of water in the solvent; (3) the water content of the hydrocarbonaceous solid being treated; and (4) the degree of water removal desired in a given process. In the specific instance of peat, containing about 70-90% water, wherein essentially all of the water originally present is to be removed through contact with an aromatic hydrocarbon such as benzene, the hydrocarbon and peat are contacted at a weight ratio of about 50:1 to about 250:1 for a time sufficient to provide a substantially equilibrium amount of water in the solvent. Particularly preferred hydrocarbon to peat weight ratios of about 60:1 to about 230:1.

Upon completion of the contacting step, at least a portion of the solvent now containing water extracted from the original solid hydrocarbonaceous material still at an elevated temperature and preferably at an elevated pressure, is removed from the solids to provide a separate solvent stream containing the removed water and a product solid stream having a diminished water content. This separation must take place at an elevated temperature, preferably a temperature substantially equal to the contacting temperature to prevent inadvertent separation of the water from the solvent phase. Preferred separation temperatures are in the range of about 300° F. to about 450° F. If an absolutely dry free flowing solid product is desired, the solvent entrained in the solid can be removed by a filtration or evaporation operation, preferably with appropriate recovery and recycle of solvent.

In a particularly preferred embodiment, however, not all of the solvent is removed from the solid material. Rather, a sufficient amount of solvent remains to provide a slurry of solids in solvent for transmittal to a conversion zone maintained at an elevated temperature and pressure to convert the solid into a more valuable product. For example, a slurry of dried solids in admixture with the remaining portion of the solvent can be passed to a coal gasification or liquefication zone for conversion to more valuable gaseous or liquid products, respectively. The weight ratio of solvent to solids in the slurry passed to the conversion zone is whatever is required to maintain the solids in suspension according to their size and density relative to the liquid. This ratio is ordinarily in the range of 4:1 to 1:1 parts by weight of liquid per parts by weight of solid. Particularly preferred is a process wherein the slurry of solvent and dewatered hydrocarbonaceous particles are passed directly to the gasification conversion process for the conversion of the coal material to a gaseous product.

In any event, the stream of solvent containing water removed from the now dewatered solids is cooled, preferably first by heat exchange and then by ambient water or air to a lower temperature, preferably a temperature at least about 200° F. lower than the original contacting or extraction temperature to cause the water to physically separate from the solvent and to provide a separate water phase and a solvent phase. Preferred are temperatures of about less than 150° F. Particularly preferred are temperatures of less than about 100° F. The solvent phase is relatively free of water, i.e. substantially no entrained water is present in the solvent, and the water phase is relatively free of solvent, i.e. the water stream is substantially free of entrained solvent. In other words, only equilibrium water and solvent concentrations are present in the solvent and water streams respectively. In the case of a hydrocarbon solvent, the solvent will separate as a lighter phase which can be easily separated from the heavier aqueous phase. If it is desirable to keep losses to a minimum, the water stream can be subjected to distillation or other appropriate means such as further cooling to recover the small amounts of solvent that may still be dissolved in the water stream.

The liquid solvent, now relatively free of water, is then returned, at least in part, if not in entirety, to the initial contacting step to provide at least a portion of the liquid solvent utilized therein. The efficiency of the overall separation process can be increased if the recycled solvent stream is first subjected to additional fractionation, etc. to remove the small amount of water dissolved therein. In general, however, through the selection of solvents wherein the water is relatively insoluble therein, this additional separation is not required.

The process of the present invention is particularly suited in the treatment of peat and lignite initially containing about 90 to about 40 percent water. Through the utilization of the process of the present invention, the resultant product peat or lignite will have a diminished water content containing about 1 to about 20 percent and preferably about 1 to about 10 percent of the water originally present.

As indicated, the process of the present invention is particularly suited to removing moisture from a hydrocarbonaceous solid prior to its introduction to a conversion zone maintained in an elevated temperature and pressure such as a gasification reaction zone. When a slurry of the hydrocarbonaceous solid and solvent is introduced into such a zone, the solvent is readily recoverable from the resultant product and recycled for further use in the process in the extraction or removal of additional amounts of water or moisture from the feed solids.

DETAILED DESCRIPTION OF PREFERRED EMBODIMENT OF THIS INVENTION

FIG. 1 is a detailed schematic flow diagram illustrating a particularly preferred embodiment of the present invention for the removal of moisture from peat and the conversion of the thus dried peat in a gasification zone to a more valuable gaseous product.

Referring to FIG. 1, 500 pounds/hr of peat having an 80% moisture content, i.e. 100 pounds/hr of peat and 400 pounds/hr of water, entering via line 1 is admixed with 400 pounds/hr of benzene entering via line 2 in mixing zone 5 to provide a substantially uniform slurry of peat and benzene. The benzene entering line 2 is derived from makeup benzene, when required, entering line 3 and recycled benzene entering line 4 as recovered from gasification reactor 22. The resultant slurry is removed from mixing zone 5 via line 6 and passed by line 7 to pump 8 where it is then transmitted in line 10 after being admixed with 10,200 pounds/hr of benzene containing 14 pounds of water to heat exchange zone 11. Within heat exchange zone 11, the now diluted peat and benzene slurry is heat exchanged against a hot benzene stream 15 removed from separation zone 14 to preheat the slurry and to effectively recover heat from stream 15. The preheated peat and benzene slurry is further heated in heater 12 to a temperature of approximately 400° F. The thus fully heated slurry is then passed via line 13 to separation zone 14 wherein the mixture is maintained for separation at a temperature of 400° F. and 600 psig. Within the separation zone 14, the benzene peat slurry is allowed to separate, the lighter benzene, now containing water in substantially equilibrium concentrations, rising to the top of separation zone 14 and the more dense solid peat settling to the bottom of separation zone 14. 10,206 pounds/hr of benzene having dissolved therein 398 pounds of water is removed from the upper portion of separation zone 14 at a temperature of 400° F. via line 15 and is indirectly heat exchanged, as previously described, in heat exchange zone 11 against fresh incoming slurry. The benzene is cooled to a temperature of approximately 120° F. in heat exchange zone 11 prior to passage via line 15 to heat exchange zone 16 wherein the hot benzene water solution is further cooled by heat exchange with ambient air or cooling water to a temperature of about 100° F. before passage via line 17 to separation zone 18. The thus cooled benzene-water mixture separates within separation zone 18 into two separate phases; a heavier aqueous phase and a lighter benzene phase. The lighter benzene phase is removed from separation zone 18 via line 19 where it is transmitted by pump 20 and line 9 for admixture with the peat benzene slurry emanating from pump 8. As indicated, the benzene removed from separation zone 18 via line 19 comprises approximately 10,200 pounds/hr of benzene containing about 14 pounds of water.

The heavier water phase containing 384 pounds/hr of water and 0.8 pounds/hr of benzene is removed from the lower portion of separation zone 18 via line 30. To minimize valuable solvent loss and to avoid the discharge of potentially hazardous chemicals to the environment, the water removed from separation zone 18 via line 30 is passed through heat exchange zone 31 wherein it is preheated prior to passage to distillation zone 33. Within distillation zone 33 the water, containing small amounts of dissolved benzene, is distilled to remove benzene vapor overhead via line 36 which is condensed in overhead condenser 37 prior to being passed via line 38 to a reflux drum 39. Benzene distillate is removed overhead from drum 39 in the amount of 0.8 pounds/hr and passed via line 41 for admixture with the peat benzene slurry produced in mixing zone 5. An additional amount of benzene is refluxed to the top portion of distillation column 33 via line 40. The necessary heat input to distillation column 33 is provided by a conventional heat exchange medium 34. The water now substantially free from benzene is removed from the bottom of distillation column 33 via line 35 and is heat exchanged against the feed to distillation column 33 in heat exchanger 31 as previously described to provide approximately 384 pounds/hr for discharge.

Approximately 100 pounds/hr of peat in admixture with 400 pounds of benzene and 16 pounds/hr of water removed by line 21 from the bottom portion of separation zone 14 is passed to gasification reactor 22. Gasification reactor 22 is a conventional gasification reactor for the conversion of the peat to a more valuable fuel gas by reaction with steam and air or oxygen entering the bottom portion thereof via lines 23 and 24. Residual ash is removed from the bottom portion of reactor 22 via line 25. A gaseous product is removed from the top portion of gasification reactor 22 via line 26 and cooled by condenser 27 prior to passage to separation zone 28. Separation zone 28 separates the normally liquid hydrocarbon including the benzene originally passed to gasification zone 22 from the desired gaseous product and condensed steam, i.e. water. Specifically, the condensed normaly liquid hydrocarbons are removed via line 4 and returned to mxing zone 5 for admixing with the incoming water containing peat. Recycled benzene in line 4 can, if desired, be further fractionated to separate or remove therefrom any additional normally liquid hydrocarbons which may be formed by the reaction of the peat with the oxygen etc. In this event, no make up benzene need be added via line 3. Rather line 3 can be utilized to remove benzene actually produced in the gasification reaction. In any event, the more valuable gaseous product is removed from the top portion of separation zone 28 for further treatment and use by means well known to those trained in the art. Condensed steam, i.e. water, is removed from the bottom portion of separation zone 28 by line 42.

The process illustrated and described has the particular advantage of providing a thermally efficient method of removing the large amounts of water present in the peat and to provide a substantially water free peat mixture to gasification zone 22. The fact that most of the water has been removed from the peat before passage to conversion zone 22 substantially decreases the amount of energy required to effect the gasification reaction within the reaction zone 22. In addition, since the water has been removed from the peat prior to the passage to gasification reactor 22, very little steam is produced within reaction zone 22 by the evaporation of moisture from the peat. As a result, the product gases removed from the reaction zone are not unduly diluted with additional amounts of steam over and beyond that necessary to effect the gasification reaction.

Most importantly, to evaporate the water from the 80% moisture peat by heating would require the utilization of about 45–50% of the heating value of the peat. In contrast, the process of the present invention as illustrated in FIG. 1 requires only about 11–12% of the heating value of the peat.

We claim:

1. A process for treating a hydrocarbonaceous solid containing water to remove at least a portion of the water from the solid which comprises:
   (i) contacting the water containing solid with a liquid solvent relatively free of moisture at an elevated temperature to transfer at least a portion of the water in the solid into the solvent, said solvent characterized by its ability to dissolve only relatively small amounts of water at low temperatures and its ability to dissolve substantially greater amounts of water at higher temperatures;
   (ii) removing at least a portion of the solvent containing water from the resultant solids at an elevated temperature to provide a solvent stream containing water and a product solid stream having a diminished water content;
   (iii) cooling the solvent containing water stream to a lower temperature to cause the water to separate from the solvent and to provide a liquid solvent stream relativey free of water and a water stream relatively free of solvent; and,
   (iv) passing at least a portion of the liquid solvent stream relatively free of moisture to contacting step (i) to provide at least a portion of the liquid solvent utilized therein.

2. A process as in claim 1 wherein the solid hydrocarbonaceous solid is coal.

3. A process as in claim 2 wherein the coal is peat.

4. A process as in claim 2 wherein said coal initially contains about 40 to about 90 wt% water.

5. A process as in claim 3 wherein the product peat having a diminished water content contains about 1 to about 20 percent of the water originally present in the peat.

6. A process as in claim 1 wherein said solvent is a hydrocarbon.

7. A process as in claim 6 wherein said solvent is an aromatic hydrocarbon.

8. A process as in claim 7 wherein said aromatic hydrocarbon is benzene, toluene or a xylene or mixtures thereof.

9. A process as in claim 7 wherein the hydrocarbonaceous solid is peat, said peat being contacted with said hydrocarbon in an amount and at a temperature sufficient to provide a hydrocarbon to peat weight ratio of about 60:1 to about 230:1 and a contacting temperature of about 300° to 450°F.

10. A process as in claim 9 wherein the solvent containing water is cooled to a temperature at least about 200° F. lower than the original contacting temperature.

11. In a process for the conversion of a water containing hydrocarbonaceous solid into a more valuable product in a conversion zone maintained at an elevated temperature and pressure wherein the present of water in the solid lowers the overall thermal efficiency of the conversion process, the improvement which comprises the removal of at least a portion of the water from the hydrocarbonaceous solid, said water removal comprising:
(i) contacting the water containing solid with a liquid hydrocarbon solvent relatively free of water at an elevated temperature to transfer at least a portion of the water in the solid into the solvent, said solvent characterized by its ability to dissolve relatively small amounts of water at low temperatures and its ability to dissolve substantially greater amounts of water at higher temperatures;
(ii) removing a portion of the solvent containing water from the resultant solids at an elevated temperature to provide a solvent stream containing water and a slurry of solids in admixture with at least a portion of the remaining solvent, said slurried solids having a diminished water content;
(iii) cooling the solvent stream containing water to a lower temperature to provide a liquid hydrocarbon solvent stream relativey free of water and a water stream relatively free of solvent;
(iv) passing at least a portion of the liquid hydrocarbon solvent stream relatively free of moisture to contacting step (i) to provide at least a portion of the liquid hydrocarbon solvent utilized therein; and,
(v) passing the slurry of carbonaceous solids and solvent to the conversion zone for conversion to more valuable products whereby increased thermal efficiency is obtained.

12. A process as in claim 1 wherein the conversion product includes normally liquid hydrocarbons, at least a portion of which hydrocarbons are recovered and passed to contacting step (i) to provide at least a portion of the liquid hydrocarbon solvent.

13. A process as in claim 11 wherein said solvent is an aromatic hydrocarbon.

14. A process as in claim 13 wherein said aromatic hydrocarbon is benzene, toluene or a xylene.

15. A process as in claim 11 wherein the hydrocarbonaceous solid is peat, said peat being contacted with said hydrocarbon in an amount and at a temperature sufficient to provide a hydrocarbon to peat weight ratio of about 60:1 to about 230:1 and a contacting temperature of about 300° to 450° F.

16. A process as in claim 15 wherein the solvent is cooled to a temperature at least about 200° F. lower than the original contacting temperature.

17. A process as in claim 15 wherein the weight ratio of solvent to solids is reduced to about 4:1 to about 1:1 in removal step (ii).

* * * * *